US012158731B2

(12) United States Patent
Fleury et al.

(10) Patent No.: US 12,158,731 B2
(45) Date of Patent: Dec. 3, 2024

(54) WATCH COMPRISING AN AUXILIARY FUNCTION ALLOWING THE INDICATION OF SECONDS

(71) Applicant: ETA SA Manufacture Horlogère Suisse, Grenchen (CH)

(72) Inventors: Emmanuel Fleury, Moutier (CH); Pascal Lagorgette, Bienne (CH)

(73) Assignee: ETA SA MANUFACTURE HORLOGÈRE SUISSE, Grenchen (CH)

( * ) Notice: Subject to any disclaimer, the term of this patent is extended or adjusted under 35 U.S.C. 154(b) by 314 days.

(21) Appl. No.: 17/698,515

(22) Filed: Mar. 18, 2022

(65) Prior Publication Data

US 2022/0397867 A1 Dec. 15, 2022

(30) Foreign Application Priority Data

Jun. 14, 2021 (EP) .................................... 21179307

(51) Int. Cl.
*G04C 3/16* (2006.01)

(52) U.S. Cl.
CPC .................................... *G04C 3/16* (2013.01)

(58) Field of Classification Search
CPC .................................................... G04C 3/146
See application file for complete search history.

(56) References Cited

U.S. PATENT DOCUMENTS 4,290,129 A * 9/1981 Ushikoshi .............. G04C 10/04 368/203
2004/0008586 A1* 1/2004 Ono ....................... G04C 3/008 368/110
2004/0047242 A1 3/2004 Germiquet et al.
(Continued)

FOREIGN PATENT DOCUMENTS

EP 1 748 331 B1 10/2010
JP 2013-228258 A 11/2013
(Continued)

OTHER PUBLICATIONS

European Search Report for EP 21 17 9307 dated Oct. 26, 2021.
(Continued)

*Primary Examiner* — Renee S Luebke
*Assistant Examiner* — Matthew Hwang
(74) *Attorney, Agent, or Firm* — Sughrue Mion, PLLC

(57) ABSTRACT

An analogue display watch (10) including an electronic horological movement including a first and a second electric motor (13, 14) kinematically connected respectively to an hour hand (15) and to a minute hand (16), the electric motors being power supplied by an electric accumulator (12), the horological movement also comprising an integrated circuit (17) connected to the motors and to a control member (18), the watch (10) being characterised in that the integrated circuit (17) is configured so as to control, when the control member (18) is requested by a user, the first and the second electric motor (13, 14) to rotate the hour (15) and minute
(Continued)

(16) hands at an angular speed of displacement of six degrees per second, and in such a way that they are disposed so as to be collinear and that they are superimposed on each other.

11 Claims, 1 Drawing Sheet

(56) References Cited

U.S. PATENT DOCUMENTS

| | | | | |
|---|---|---|---|---|
| 2007/0025186 | A1* | 2/2007 | Gilomen | G04C 3/146 368/80 |
| 2013/0033970 | A1* | 2/2013 | Miyake | G04G 9/0064 368/80 |
| 2015/0253739 | A1 | 9/2015 | Iida et al. | |
| 2015/0309477 | A1 | 10/2015 | Okeya et al. | |
| 2017/0075306 | A1* | 3/2017 | Morohoshi | G04G 3/00 |
| 2017/0082981 | A1 | 3/2017 | Hasegawa | |
| 2018/0203417 | A1 | 7/2018 | Sakai et al. | |
| 2020/0033814 | A1 | 1/2020 | Klopfenstein | |

FOREIGN PATENT DOCUMENTS

| | | | |
|---|---|---|---|
| JP | 2015-169566 | A | 9/2015 |
| JP | 2015-184193 | A | 10/2015 |
| JP | 2018-116042 | A | 7/2018 |
| JP | 2020-16648 | A | 1/2020 |

OTHER PUBLICATIONS

Notification of Reasons for Refusal dated Apr. 25, 2023 from the Japanese Patent Office in application No. 2022-051165.
Korean Office Action dated Mar. 18, 2024 in Application No. 10-2022-0068868.
Swindon, " The Keeper of Time" YouTube, Feb. 21, 2020,(1 page) URL :https://www.youtube.com/watch?v =-E4tIF2RXsk.

* cited by examiner

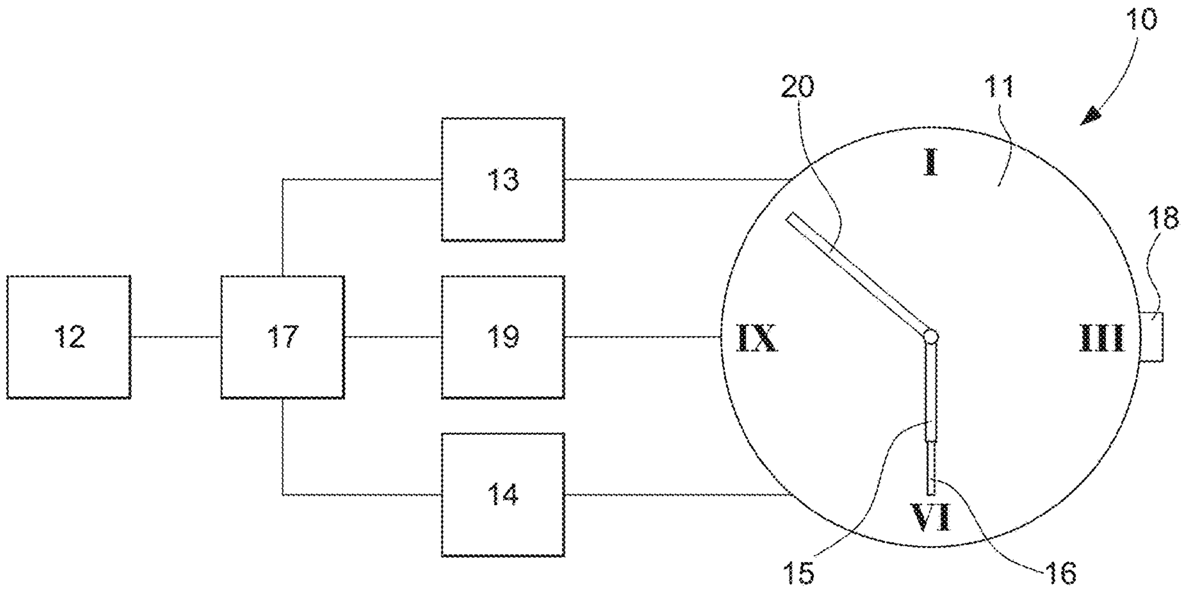
10
20
11
I
13
18
12
17
19
IX
III
14
VI
15
16

WATCH COMPRISING AN AUXILIARY FUNCTION ALLOWING THE INDICATION OF SECONDS

CROSS REFERENCE TO RELATED APPLICATION

This application claims priority to European Patent Application No. 21179307.0 filed Jun. 14, 2021, the entire contents of which are incorporated herein by reference.

TECHNICAL FIELD OF THE INVENTION

The invention relates to the field of watchmaking, and in particular electromechanical watches, that is to say comprising electronic horological movements, with analogue display.

More particularly, the invention relates to a watch comprising an auxiliary function, that is to say that the analogue display of the watch is adapted to provide information to the user other than the current time. This auxiliary function advantageously allows to indicate the seconds.

TECHNOLOGICAL BACKGROUND

Watches including an electromechanical horological movement with analogue display, supplied with electrical energy by an electric accumulator are well known in the prior art.

The analogue display consists of two hands respectively indicating the hours and minutes of the current time, and optionally a third hand indicating the seconds.

These hands can be moved by electric motors, for example stepper motors, which are specific thereto, so that the travel of said hands is independent of each other. Such an arrangement finds its advantage, in particular, in order to be able to drive said hands in order to fulfil a particular auxiliary function.

For example, document EP0644468 describes a watch comprising an hour hand and a minute hand arranged to be rotated independently of each other, wherein said hands carry alphanumeric characters or parts of alphanumeric characters. These hands are intended to display messages to the user according to the time and according to their arrangement relative to each other.

Another known auxiliary function fulfilled by such an arrangement is the display of several time zones.

The present invention pursues this objective of providing an analogue display watch with at least two hands, wherein the hands can perform auxiliary functions.

SUMMARY OF THE INVENTION

To this end, the present invention relates to an analogue display watch including an electronic horological movement comprising a first and a second electric motor kinematically connected respectively to an hour hand and a minute hand, said electric motors being power supplied by an electric accumulator, said horological movement also comprising an integrated circuit connected to said motors and to a control member. The integrated circuit is configured so as to control, when the control member is requested by a user, the first and the second electric motor to rotate the hour and minute hands at an angular speed of displacement of six degrees per second, and in such a way that they are disposed so as to be collinear and that they are superimposed on each other.

The terms "collinear" and "superimposed" mean that the longitudinal axes of the hour and minute hands are parallel and that said hands are oriented in the same sense and in the same direction. In other words, the hour and minute hands occupy the same angular position and simultaneously show the same indication, so that reading the information is made particularly easy for the user.

In particular embodiments, the invention may further include one or more of the following features, taken alone or in all technically possible combinations.

In particular embodiments of the invention, the integrated circuit is configured, after a predetermined duration, to control the first and the second electric motor so as to respectively displace the collinear and superimposed hour and minute hands, so that they respectively indicate the hours and minutes of the current time.

In particular embodiments of the invention, the integrated circuit is configured, when the control member is again requested, to control the first and the second electric motor so as to respectively displace the collinear and superimposed hour and minute hands, so that they respectively indicate the hours and minutes of the current time.

In particular embodiments of the invention, the watch includes a third motor connected to a seconds hand, the integrated circuit being configured to control said third motor to stop the travel of said seconds hand when the control member is requested.

In particular embodiments of the invention, the watch includes a third motor connected to a seconds hand, the integrated circuit being configured so as to control, when the control member is requested, said third motor to rotate the seconds hand at an angular speed of displacement of six degrees per second, and in such a way as to be collinear with the hour and minute hands and that they are superimposed on each other.

In particular embodiments of the invention, the watch comprises a third motor connected to a seconds hand, and the integrated circuit is configured so as to control the first, second and third electric motors in order to respectively displace the hour, minute and second hands, so that during the first minute following a request from the control member, they are all collinear and superimposed and rotated at an angular speed of displacement of six degrees per second, and that from the 61st second following said request, the minute hand indicates the number of minutes elapsed since said request, and that from the 3601st second following said request, the hour hand indicates the number of hours elapsed since the request.

In particular embodiments of the invention, the watch comprises a third motor connected to a seconds hand, and the integrated circuit is configured so as to control, when the control member is requested, the third electric motor in order to drive the seconds hand at an angular speed of displacement of more than 360 degrees per second, for example 720 degrees per second or 3600 degrees per second.

In particular embodiments of the invention, the watch comprises a third motor connected to a seconds hand, and the integrated circuit is configured so as to control, when the control member is requested, the third electric motor to displace the seconds hand to indicate a particular location on the dial designating the function assumed by the collinear and superimposed hour and minute hands.

In particular embodiments of the invention, the integrated circuit is configured so as to control the first and the second electric motor so that the hour and minute hands are collinear and superimposed on each other in a common position located equidistantly between the positions that said hands occupied before being displaced to be collinear and superimposed.

In particular embodiments of the invention, the integrated circuit is configured so as to control, when the control member is requested, the first or the second electric motor to respectively displace the hour hand or the minute hand from the position it occupies in an initial state wherein it respectively indicates the hours or the minutes of the current time, to the position occupied by the other hand, so that they are collinear and superimposed on each other.

In particular embodiments of the invention, the control member consists of a single element.

In particular embodiments of the invention, the control member corresponds to a time-setting crown.

BRIEF DESCRIPTION OF THE FIGURES

Other features and advantages of the invention will appear upon reading the following detailed description given by way of non-limiting example, with reference to the appended drawing:

FIG. 1 schematically shows, in block diagram and partially, a watch according to a preferred embodiment of the invention, wherein the hour and minute hands are collinear and superimposed.

DETAILED DESCRIPTION OF THE INVENTION

In the present description, all the components of an analogue display electromechanical watch 10, as well as their arrangement, which are well known to the person skilled in the art, are only described in a simplified manner.

The watch 10 according to the present invention includes a case to which are fixed a crystal and a back together defining an internal volume.

In this internal volume are housed components partly shown schematically in FIG. 1, including a dial 11, an electric accumulator 12 intended to power supply, through an electronic circuit, two electric motors 13 and 14 allowing to rotate respectively an hour hand 15 and a minute hand 16 via geartrains. Optionally, the watch 10 may include a third motor 19 connected to a seconds hand 20.

More particularly, in the preferred embodiment of the invention, the watch 10 includes only two hands, a first electric motor 13 being kinematically connected to the hour hand 15 and a second electric motor 14 being kinematically connected to the minute hand 16.

The electronic circuit further includes, in a manner known to the person skilled in the art, a quartz oscillator (not shown in the FIGURE) associated with an integrated circuit 17, for example formed by a microcontroller. Advantageously, the integrated circuit 17 knows at all times the current time and the angular position of each of the hands.

A control member 18 intended to be handled by a user is connected to the integrated circuit 17.

The control member 18 preferably consists of a single movable element, and for example formed by any component adapted for this purpose, for example by a rotating bezel, a push button, a touch surface of the case or of the crystal, etc. Preferably still, the control member 18 corresponds to a crown, for example having a push-piece, forming a time-setting crown.

The integrated circuit 17 is configured so as to servo-control, when the control member 18 is requested, for example pushed or pulled by a user, the first and second electric motors 13 and 14 in order to arrange the hour 15 and minute 16 hands collinearly and to superimpose them on each other, as shown in FIG. 1, to perform a predetermined function.

The terms "collinear" and "superimposed" mean that the longitudinal axes of the hour and minute hands are parallel and that said hands are oriented in the same sense and in the same direction.

More particularly, the integrated circuit 17 is configured to control the first and the second electric motor 13 and 14 in order to respectively displace the hour hand 15 and the minute hand 16 in order to arrange them collinearly and so that they are superimposed on each other, when the control member 18 is requested by a user, and to rotate said collinear and superimposed hands at a predetermined speed.

The hour 15 and minute 16 hands are thus displaced from an initial state wherein they respectively indicate the hours and minutes of the current time, to an intermediate state, wherein they are collinear and superimposed and rotated at a predetermined speed.

Thus, the user only visually perceives a single hand moving, which facilitates the reading of the information provided by the latter.

Advantageously, the drive speed of the hour 15 and minute 16 hands corresponds to an angular displacement of six degrees per second. The hand visually perceived by the user therefore indicates the seconds.

This function is particularly advantageous in the case of a watch 10 comprising an analogue display consisting of only an hour hand 15 and a minute hand 16.

Indeed, in this case, this feature allows the user, by benefiting from an indication of the seconds, to be able to measure time intervals more precisely.

If the watch 10 includes a seconds hand 20, its travel can be stopped, or else said seconds hand 20 can be arranged collinearly and superimposed with the hour 15 and minute 16 hands, said hour 15, minute 16 and seconds hands 20 being superimposed on each other, and can be driven in an angular displacement of six degrees per second, when the control member 18 is requested.

The control member then advantageously allows the simultaneous control of all the electric motors and therefore the simultaneous displacement of all the hands.

Alternatively or in addition, the integrated circuit 17 can be configured so as to perform a chronograph function when the control member 18 is requested. More particularly, the integrated circuit 17 is configured so as to control the first, second and third electric motors in order to respectively displace the hour 15, minute 16 and seconds hands, so that during the first minute following a request from the control member, they are all collinear and superimposed and rotated at an angular speed of displacement of six degrees per second, and that from the $61^{st}$ second following said request, the minute hand 16 indicates the number of minutes elapsed since said request, and that from the $3601^{st}$ second following said request, the hour hand 15 indicates the number of hours elapsed since the request.

Still alternatively, it is possible that the integrated circuit 17 is configured so as to control, when the control member 18 is requested, the third electric motor 19 in order to drive the seconds hand 20 at an angular speed of displacement of more than 360 degrees per second, for example 720 degrees per second or 3600 degrees per second. Thus, the seconds hand 20 can indicate fractions of seconds when the hour 15 and minute 16 hands indicate the seconds.

Still alternatively, the integrated circuit 17 is configured so as to control, when the control member 18 is requested, the third electric motor 19 in order to displace the seconds hand 20 to indicate a particular location on the dial, for example bearing a specific marking designating the function assumed by the collinear and superimposed hour 15 and minute 16 hands, for example the indication of the seconds or a chronograph function Since the seconds hand is generally the longest hand, the indication it provides is very readable for the user.

Advantageously, the integrated circuit 17 can be configured so as to perform one or more of the aforementioned functions, for example after a certain delay of a continuous request of the control member 18, or positioning by the user of the hour 15 and/or minute 16 hands in a given position, for example so as to indicate a dedicated place on the dial, etc.

In an exemplary embodiment of the invention, when the control member 18 is requested, the first and second electric motors 13 and 14 displace the hour hand 15 and the minute hand 16, so that they are collinear and superimposed on each other, so that they reach a common position located equidistantly between the positions they respectively occupied in the initial state.

In other words, the common position reached by the hour 15 and minute 16 hands before being rotated at a predetermined speed, defines one of the bisectors of the angles formed by the position of said hour 15 and minute 16 hands when they are in their initial state.

Alternatively, when the control member 18 is requested, the first or second electric motor 13 or 14 respectively displaces the hour hand 15 or the minute hand 16 from the position they respectively occupy in their initial state, to the position occupied by the other hand so that they are collinear and superimposed on each other.

It goes without saying that, in the case where the watch 10 includes a seconds hand, the latter can be displaced by the third electric motor, when the control member 18 is requested, so as to reach the common position described above or corresponding to the position of the hour 15 and minute 16 hands, so that the hands are all collinear and superimposed on each other.

The driving of the collinear and superimposed hour 15 and minute 16 hands is interrupted after a predetermined duration, for example a few seconds or tens of seconds, or after a new request from the control member 18.

The integrated circuit 17 is then configured, after the predetermined duration or when the control member 18 is requested again, to control the first and the second electric motor 13 and 14 so as to respectively displace the hour 15 and minute 16 hands so that they occupy a final state wherein they respectively indicate the hours and minutes of the current time.

In other words, the final state of the hour 15 and minute 16 hands would correspond to their initial state if they had not been displaced to the intermediate state.

The invention claimed is:

1. An analogue display watch including an electronic horological movement, comprising:

a first and a second electric motor kinematically connected respectively to an hour hand and to a minute hand, said electric motors being power supplied by an electric accumulator; and an integrated circuit connected to said motors and to a control member, the integrated circuit being configured so as to control, when the control member is requested by a user, the first and the second electric motor to rotate the hour and minute hands at an angular speed of displacement of six degrees per second, and in such a way that they are disposed so as to be collinear and that they are superimposed on each other in a common position located equidistantly between positions that said hands occupied before being displaced to be collinear and superimposed.

2. The watch according to claim 1, wherein the integrated circuit is configured, after a predetermined duration, to control the first and the second electric motor so as to respectively displace the collinear and superimposed hour and minute hands, so that they respectively indicate the hours and minutes of a current time.

3. The watch according to claim 1, wherein the integrated circuit is configured, when the control member is again requested, to control the first and the second electric motor so as to respectively displace the collinear and superimposed hour and minute hands, so that they respectively indicate the hours and minutes of a current time.

4. The watch according to claim 1, further comprising a third motor connected to a seconds hand, and wherein the integrated circuit being configured to control said third motor to stop the travel of said seconds hand when the control member is requested.

5. The watch according to claim 1, further comprising a third motor connected to a seconds hand, and wherein the integrated circuit being configured so as to control, when the control member is requested, said third motor to rotate the seconds hand at an angular speed of displacement of six degrees per second, and in such a way as to be collinear with the hour and minute hands and that they are superimposed on each other.

6. The watch according to claim 1, further comprising a third motor connected to a seconds hand, and wherein the integrated circuit being configured so as to control the first, second and third electric motors in order to respectively displace the hour, minute and second hands, so that during the first minute following a request from the control member, they are all collinear and superimposed and rotated at an angular speed of displacement of six degrees per second, and that from the 61st second following said request, the minute hand indicates the number of minutes elapsed since said request, and that from the 3601st second following said request, the hour hand indicates the number of hours elapsed since the request.

7. The watch according to claim 1, further comprising a third motor connected to a seconds hand, and wherein the integrated circuit is configured so as to control, when the control member is requested, the third electric motor in order to drive the seconds hand at an angular speed of displacement of more than 360 degrees per second.

8. The watch according to claim 1, further comprising a third motor connected to a seconds hand, and wherein the integrated circuit is configured so as to control, when the control member is requested, the third electric motor in order to displace the seconds hand to indicate a particular location on the dial designating the function assumed by the collinear and superimposed hour and minute hands.

9. The watch according to claim 1, wherein the control member consists of a single movable element.

10. An analogue display watch including an electronic horological movement, comprising:

a first and a second electric motor kinematically connected respectively to an hour hand and to a minute hand, said electric motors being power supplied by an electric accumulator; and an integrated circuit connected to said motors and to a control member, the integrated circuit being configured so as to control, when the control member is requested by a user, the first and the second electric motor to rotate the hour and minute hands at an angular speed of displacement of six degrees per second, and in such a way that they are disposed so as to be collinear and that they are superimposed on each other, wherein the integrated circuit is configured so as to control, when the control member is requested, the first or the second electric motor to respectively displace the hour hand or the minute hand from a position it occupies in an initial state wherein it respectively indicates the hours or the minutes of a current time, to a position occupied by the other hand, so that they are collinear and superimposed on each other.

11. The watch according to claim 9, wherein the control member corresponds to a time-setting crown.

* * * * *